United States Patent [19]
Mueller et al.

[11] 3,812,269
[45] May 21, 1974

[54] PROPIONIC ACID COATED SILICA AS A FOOD PRESERVATIVE

[75] Inventors: Hans-Karl Mueller, Bruchkobel; Gerd Lumbeck, Wolfgang, both of Germany

[73] Assignee: Deutsche Gold-Und Silber-Scheideanstalt vormals Roessler, Frankfurt am Main, Germany

[22] Filed: Aug. 7, 1972

[21] Appl. No.: 278,648

[30] Foreign Application Priority Data
Aug. 10, 1971 Germany............................ 2140009

[52] U.S. Cl................ 426/227, 426/807, 426/151, 426/210, 426/335, 252/400 R
[51] Int. Cl............................................... A23r 3/00
[58] Field of Search........... 99/2 R, 2 G, 2 CD, 2 V, 99/8, 83, 93–94, 150 R, 153; 424/317, 357; 426/227, 807, 151, 218, 211, 335

[56] References Cited
UNITED STATES PATENTS

| 2,154,449 | 4/1939 | Hoffman et al............. 99/153 X |
| 2,879,161 | 3/1959 | Valentine et al................ 99/2 V |
| 2,965,488 | 12/1960 | Belasco............................ 99/2 ND |
| 3,505,080 | 4/1970 | Cullen............................ 99/140 R X |
| 3,624,222 | 11/1971 | Nelson................................ 99/8 X |
| 3,627,885 | 12/1971 | Rondelet et al................ 424/357 X |
| 3,632,352 | 1/1972 | Muller................................ 99/2 CD |
| 3,644,215 | 2/1972 | Muller.............................. 99/2 R X |

OTHER PUBLICATIONS

Chemistry and Industry, "A Simple Method of Protecting Cereals An Other Stored Foodstuffs Against Insect Pests," Jan. 1943, Kitchener et al. pp. 32–33.

*Primary Examiner*—Norman Yudkoff
*Attorney, Agent, or Firm*—Michael S. Striker

[57] ABSTRACT

A food preservative for use particularly in animal feeds and cereals consists of a pourable pulverulent mixture of two to three parts propionic acid and one part of a finely dispersed, activated synthetically formed silicic acid, silicate or mixture of both.

3 Claims, No Drawings

PROPIONIC ACID COATED SILICA AS A FOOD PRESERVATIVE

BACKGROUND OF THE INVENTION

The invention relates to a food preservative for use particularly in animal feeds and cereals which is based on propionic acid and permits stabilization of the food products against attack by bacteria and mold formation.

It is generally established that grain which has the natural harvest humidity cannot be stored without special treatment. Mold formation sets in after short storage times even at water contents as low as 17 to 18 percent and this results in an even further spoilage of the crop.

Heretofore expensive drying, cooling and airing processes requiring rather high investments have been used to prevent the mold formation and bacterial activity in stored grain and maize. Mold formation occurs however also in so-called concentrated feeds under certain conditions and impairs the use as feed material. The formation of molds and the bacterial activity results in a spontaneous heating of stored mixed feeds which in turn causes caking together and discoloration. In recent times damp corn, granular maize and concentrated feeds have successfully been stabilized for storage without drying, cooling and airing by treating them with propionic acid. Propionic acid in comparatively small amounts suppresses the growth of molds and bacteria. The fact that propionic acid and its salts have antimicrobial properties and that for instance sodium propionate has an effect on the growth of certain physiological organisms is well established.

Propionic acid is the third member of the series of so-called fatty acids and has the formula

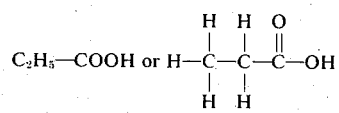

Similar to other organic acids when used as preservatives propionic acid is most effective in an acid environment. The minimum inhibitory concentration is proportional to the pH value. The nondissociated propionic acid is the active component.

This fact and its realization are important because frequently sodium and calcium propionates are used as preservatives. In the medium where they are used they must be converted to the free acid by means of an ion exchange in order to make the properties as preservative effective.

The liquid propionic acid has therefore been applied by spraying to composite feeds in order to obtain a better and more rapid action. However, a good distribution could be obtained in this case only by substantial efforts in forming the mixture.

The amount of additives to foodstuff and in particular feeds is of the magnitude between 0.1 and 0.3 percent. It will therefore readily be understood that such small amount of liquid can only with difficulty be dosed into a pulverulent or granular material or be distributed in such material.

It is therefore an object of the present invention to provide for a high activity of the liquid propionic acid together with an easy manner of application to the media to be protected.

More specifically, the invention has the object to provide for a means for preserving foodstuffs, particularly feeds and cereals, by use of propionic acid and to obtain a bactericidal or bacteriostatic and fungicidal or fungistatic action by optimum distribution of the propionic acid in the product.

SUMMARY OF THE INVENTION

This invention resides in a pulverulent mixture which can be applied by pouring and comprises two to three parts of propionic acid and one part of a highly dispersed silicic acid or silicate or mixture of silicic acid and silicate.

DETAILS OF THE INVENTION AND PREFERRED EMBODIMENTS

The terms "silicic acid" or "silicate" as used herein imply a finely divided pyrogenically obtained active silicic acid (fume silica) identified below as A, or a wet precipitated activated silicic acid or calcium- or aluminum silicate, identified below as B.

The properties of the specific silicic acids or silicates are of importance. They must be in the form of powders and must have a primary particle size of less than 500 m$\lambda$, preferably of 3 to 40 m$\lambda$ and a BET surface of 100 to 500 m$^2$/g, preferably of 150 to 300 m$^2$/g.

More specifically, the pyrogenically obtained silicic acid (A) is obtained by the flame hydrolysis of silicon tetrachloride and is distinguished by a particularly fine grain size and chemical purity. This type of silicic acid is generally known as fume silica.

The most important process for obtaining the precipitated silicic acids used in the present case (B) is a precipitation process in which, by the reaction of alkali silicate solutions with acids, white precipitates of amorphous silicic acids are formed which after filtering and washing are dried and additionally may be subjected to a grinding operation.

Preferred in this case is a silicic acid identified below as C which is obtained by spray drying an aqueous silicic acid suspension. This acid because of its highly porous structure can absorb liquids of all kinds without losing its excellent flow properties.

In the precipitation process a silicic acid is first formed which has a primary particle size of about 20 millimicrons. The primary particles then form larger agglomerates, called secondary particles, of which the size and properties are affected by the conditions of the spray drying. In case of the preferred silicic acid used in the present case, the size of about 80 percent of the secondary particles are in the range between 30 and 120 microns.

As distinguished over other drying methods the spray drying results in comparatively loosely aggregated spherical secondary particles of high absorption properties for liquids.

If these spray dried silicic acids are further subjected to grinding a particularly finely divided product is obtained which below is identified as D.

The propionic acid-powder concentrates which are based on silicic acid permit an easier intermixture with the medium which is to be protected as compared with the free propionic acid and have a higher degree of activity than the liquid propionic acid since the transformation into the powder form results in the exposure of a larger surface.

This is a surprising effect since it should have been expected that the adsorption of the propionic acid by the silicic acid would cause a reduction of activity. Surprisingly however it has been found that the speed of evaporation of the propionic acid from the pulverulent concentrate is higher than that of the liquid propionic acid. This presumably is the reason for the increased activity as a protective agent against attack by bacteria.

The spontaneous heat build-up in stored feeds which results in caking together and discoloration, as already indicated, as due to the activity of the fungus molds and bacteria. Tests have shown that the addition of propionic acid in the range of 0.3 to 0.5 percent is sufficient to prevent most of the activity of the microorganisms in the feed and thus protects against the spontaneous heat build-up and the resulting more or less pronounced deterioration of the quality of the feed.

However, these amounts can further be reduced if the combination of the present invention is used without causing a decrease of the protective action.

It has also been found that the pulverulent concentrate of the invention has certain advantages in the application against liquid propionic acid.

This will further be illustrated by the following examples.

EXAMPLE I

It can be assumed that propionic acid when added to a mixed feed will reduce the pH value. On the basis of this fact the distribution of the propionic acid in a feed mix was determined by means of adding a color indicator which changes color at a specific pH value. In the following Table I, phenolphthalein and the special "indicator 5" for ammonia titration were used. The latter indicator made by the Merck Company of Germany comprises 0.02 grams methyl red, and 0.10 grams of bromocresol green dissolved in each 100 ml. of a 96 percent ethanol. This indicator is particularly valuable because of its clearly discernible end point at a pH of 5.3. The final color at a pH of 4.4 is purple red and the final color at pH 5.8 is a pure green.

The test was carried out by mixing the feed with dilute potassium hydroxide and the color indicator. This was followed by drying. The liquid propionic acid was then applied to the dried feed in one test and in the comparative test the pulverulent propionic acid concentrate of the invention was added. Both mixtures were then homogenized by shaking and the color changes of the indicator containing feed were recorded.

The concentrate used in this case consisted of 67 percent technical grade propionic acid and 33 percent of precipitated silicic acid. The silicic acid was a precipitated silicic acid sold by the Degussa Company of Germany under the designation K322S. It had a BET surface of 250 m²/g, a main primary particle size of 18 millimicrons and a specific weight of 2.05. The term BET is a conventional abbreviation for designating surface measurement according to the procedure described by Brunauer, Emmet and Teller, J. Amer. Chem Soc 60, p. 309, 1938. The material after drying for two hours at 105°C. had a degree of purity as follows:

| | |
|---|---|
| $SiO_2$ | 93% |
| $Na_2O$ | 1% |
| $Al_2O$ | 0.2% |
| $SO_3$ | 0.8% |

The results of the tests appear from the following Table I.

TABLE I

| Indicator | Amount Added of Propionic Acid (%) | Color Change of the Feed Mix After Addition of: | |
|---|---|---|---|
| | | Liquid Propionic Acid | Pulverulent Propionic Acid Concentrate of the Invention |
| Phenolphthalein | 0.5 | Not clearly discernible | Not clearly discernible |
| Methyl orange | 0.5 | Not clearly discernible | Not clearly discernible |
| Mixed Merck "Indicator 5" | 0.3 | Only a small portion of the feed mix took on a red color | The feed mix was almost completely red colored. |
| Mixed Merck "Indicator 5" | 0.5 | The predominant portion almost completely of the feed mix was red colored | The feed mix was red colored and the color was more intense than in the comparison test with liquid propionic acid. |

The amounts given in the Table regarding the addition of propionic acid relate to the propionic acid itself. This therefore is the actual amount added in case of the liquid propionic acid. However, in case of the pulverulent concentrate, the silicic acid must also be given consideration. Therefore, for instance if amount of 0.5 percent of propionic acid is added, this implies an addition of 0.75 percent of the pulverulent concentrate because of the inclusion of the silicic acid.

The pulverulent propionic acid concentrate could be mixed without difficulty with the feed due to its fine dispersion and excellent flow properties. This appears also from the Table wherein 0.3 percent of fine liquid propionic acid was found to be inadequate to be homogeneously distributed in the feed with conventional mixing processes. This is indicated by the only partial red coloring of the feed. This, however, is different where a corresponding amount of the propionic acid concentrate was added.

In case of the addition of 0.5 percent liquid propionic acid, most of the feed was colored red. However, the color was not as intense as in case of a similar amount of propionic acid in form of a pulverulent concentrate with silicic acid. The phenolphthalein and the methyl orange indicators were not suited to ring out these distinctions.

EXAMPLE II

In order to determine the evaporation speed 10 g of liquid propionic acid and 15 g of the pulverulent propionic acid concentrate which corresponded to an amount of 10 g of propionic acid, were weighed separately in Petri dishes and the loss of weight after storage for 2 hours in the open atmosphere was determined. The following weight loss was established:

TABLE II

| | |
|---|---|
| Weight loss of the liquid propionic acid | 2.7% |
| Weight loss of the propionic acid concentrate | 3.2% |

The concentrate used in this test was of the same composition as in Example I. Also, the silicic acid was of the same type as in Example I.

The pulverulent propionic acid concentrate was found to evaporate about 20 percent more rapidly than the liquid propionic acid. The increase initial evaporation speed of the powder concentrate is presumably due to the large surface after addition of the silicic acid. However, after the initial rapid action has preferred out an equilibrium forms on the basis of the faintly absorbent action of the silicic acid regarding the propionic acid which maintains the desired activity for an extended period of time.

These properties of the concentrate are highly desirable and cause a further increase of the propionic acid action in addition to the described effect of better distribution of the additive in the foodstuff.

EXAMPLE III

In order to test the significance of different types of silicic acid concentrates were formed between propionic acid and silicic acid of the type A and C above described.

Regarding type A it is additionally noticed that this is a product sold by the Degussa Company of Germany under the designation of "Aerosil 200". It has a BET surface of $200 \pm 25$ m²/g, a mean primary particle size of 12 millimicrons and a bulk weight of about 60 g/L for the average product and of about 120 g/L for the compacted product (identified as product "D") and has a pH value in a 4 percent aqueous dispersion of 3.6 to 4.3. Its analysis is as follows:

| | | |
|---|---|---|
| $SiO_2$ | >99.8% | (relative to the material which was dried for 2 hours at 105°C) |
| $Al_2O_3$ | <0.05% | |
| $Fe_2O_3$ | <0.003 | |
| $TiO_2$ | <0.03 | |
| HCl | <0.025 | |

As has been brought out before this is a fume silica.

For the purpose of the tests the silicic acid was placed in a mixing vessel, and the propionic acid was then added in a thin jet stream during continued mixing. There was thus determined the optimum amount of propionic acid which still permits the concentrate to have adequate flow properties and the maximum amount of propionic acid with which the concentrate still has a friable character.

The results of the tests appear from the following Table III.

TABLE III

| Silicic Acid | Optimum Propionic Acid Concentration (%) | Maximum Propionic Acid Concentration (%) |
|---|---|---|
| A | 73 | 86 |
| C | 67 | 71 |

As appears, with the silicic acid type A it is still possible to obtain a 73 percent pulverulent concentrate of good flow properties. If the silicic acid type C is used the concentration of propionic acid had to be slightly decreased to 67 percent, that is, two parts of propionic acid had to be mixed with one part of silicic acid. The flow properties of the propionic acid concentrate formed with the silicic acid type C were slightly better than with the acid concentrate in which the silicic acid A had been used.

The concentrate of the invention has a broad range of applications. For instance, it can be used in feed additives, such as milk extenders or milk replacers, laying mesh, individual foods, such as soybean grits, tapioca, peanut meal, fishmeal, rice, molasses, fishsolubles and grain water from beer brewing.

For the use in human food, for instance, in bread and other baking goods where the purpose is to prevent the formation of mold fungus and to counter a stringy consistency it is preferred to use the fume silica of type A, as the carrier vehicle to form a powder concentrate of the propionic acid as disclosed herein.

Regarding the percentages in the above Table III, it is noted that these refer to the propionic acid concentration as such. If, for instance, with the fume silica of the type A, a concentration of 73 percent of propionic acid was used, this would mean that in case of the concentrate for each 100 g of concentrate 73 g of propionic acid and 27 g of the silica type Aerosil 200 were used.

We claim:

1. A dry free-flowing particulate composition for use as a preservative in animal feeds and cereals which consists essentially of one part by weight of particles of a wet precipitated spray-dried silica containing between two and three parts by weight of propionic acid absorbed thereon.

2. A composition as defined in claim 1, in which the particles of wet-precipitated spray-dried silica have a primary particle size of approximately 20 millimicrons.

3. The composition as defined in claim 1 wherein the specific BET surface is between 150 and 300 m²/g.

* * * * *